US011669983B2

(12) United States Patent
Verret

(10) Patent No.: US 11,669,983 B2
(45) Date of Patent: Jun. 6, 2023

(54) FAST DETERMINANT OF HESSIAN FILTERING FOR IMAGE TIEPOINT CANDIDATE AREA ASSESSMENT

(71) Applicant: Raytheon Company, Waltham, MA (US)

(72) Inventor: Jody D. Verret, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 66 days.

(21) Appl. No.: 17/011,693

(22) Filed: Sep. 3, 2020

(65) Prior Publication Data

US 2021/0110195 A1 Apr. 15, 2021

Related U.S. Application Data

(60) Provisional application No. 62/914,646, filed on Oct. 14, 2019.

(51) Int. Cl.
*G06T 7/33* (2017.01)
*G06V 10/44* (2022.01)
*G06V 10/42* (2022.01)
*G06V 10/75* (2022.01)

(52) U.S. Cl.
CPC ............ *G06T 7/33* (2017.01); *G06V 10/435* (2022.01); *G06V 10/443* (2022.01); *G06V 10/759* (2022.01)

(58) Field of Classification Search
CPC .. G06K 9/4609; G06K 9/4642; G06K 9/6212; G06K 9/525; G06K 2009/6213; G06T 2207/10032; G06T 2207/20164; G06T 7/33

See application file for complete search history.

(56) References Cited

U.S. PATENT DOCUMENTS

| | | | | |
|---|---|---|---|---|
| 2011/0090337 A1* | 4/2011 | Klomp | ................. | G01C 11/025 348/144 |
| 2014/0112536 A1* | 4/2014 | Ely | ...................... | G06T 15/506 382/103 |
| 2018/0276885 A1 | 9/2018 | Singh et al. | | |

FOREIGN PATENT DOCUMENTS

WO WO-2021076328 A1 4/2021

OTHER PUBLICATIONS

Hartmann, W., Havlena, M. and Schindler, K., 2016. Recent developments in large-scale tie-point matching. ISPRS Journal of Photogrammetry and Remote Sensing, 115, pp. 47-62.*
Oyallon, E. and Rabin, J., 2015. An analysis of the SURF method. Image Processing On Line, 5, pp. 176-218.*
Bay, Herbert, "From wide-baseiine point and line correspondences to 3D (Doctoral Thesis)", Diss. ETH No. 16606, [Online], Retrieved from the Internet: <URL: http://dx.doi.org/10.3929/ethz-a-005212689>, (2006), 204 pgs.
Bay, Herbert, et al., "Speeded-Up Robust Features (SURF)", Computer Vision and Image Understanding, 110(3), (2008), 346-359.

(Continued)

*Primary Examiner* — Zhitong Chen
(74) *Attorney, Agent, or Firm* — Schwegman Lundberg & Woessner, P.A.

(57) ABSTRACT

A system identifies strong features in conjugate digital images and correlates the conjugate digital images for an identification of candidate tie points using only portions of the conjugate digital images that include the strong features.

9 Claims, 4 Drawing Sheets

(56) References Cited

OTHER PUBLICATIONS

Brown, Matthew, et al., "Invariant Features from Interest Point Groups", British Magazine Vision Conference, vol. 21, (2002), 656-665.

Evans, C, "Notes on the OpenSURF Library", University of Bristol, Tech. Rep. CSTR-09-001, (Jan. 2009), 25 pgs.

Fischler, M., et al., "Random Sample Consensus: A Paradigm for Model Fitting with Applications to image Analysis and Automated Cartography", Communications of the ACM, vol. 24, No. 6, (Jun. 1981), 381-395.

Getreuer, Pascal, "A Survey of Gaussian Convolution Algorithms", Image Processing On Line, 3, (2013), 286-310.

Gwosdek, Pascal, et al., "Theoretical Foundations of Gaussian convolution by extended box ?ltering", Scale Space and Variational Methods in Computer Vision, (2012), 447-458.

Harris, Chris, et al., "A Combined Corner and Edge Detector", Alvey vision conference, vol. 15, (1988), 147-151.

Lindeberg, Tony, "Feature Detection with Automatic Scale Selection", International Journal of Computer Vision, pp. 79-116, (1998), 53 pgs.

Lindeberg, Tony, "Scale-space behaviour of local extrema and blobs", Journal of Mathematical Imaging and Vision, 1, (1992), 65-99.

Lindeberg, Tony, "Scale-Space for Discrete Signals", IEEE Transactions on Pattern Analysis and Machine Intelligence, 12, pp. 234-254, (1990), 32 pgs.

Lowe, D., "Distinctive Image Features from Scale-Invariant Keypoints", International Journal of Computer Vision, 60(2), (Nov. 2004), 91-110.

Lowe, David G, et al., "Object recognition from local scale-invariant features", The Proceedings of the Seventh IEEE International Conference on Computer Vision, 1999, vol. 2, Retrieved at <http:/lwww.cs.ubc.ca/lowe/papers/iccv99.pdf>, (1999), 1150-1157.

Mallat, Stephane, "", A Wavelet Tour of Signal Processing—The Sparse Way, 3rd Edition, Academic press, (2009), 824 pgs.

Mikolajczyk, Krystian, ef al., "A Comparison of Af?ne Region Detectors", International Journal of Computer Vision 65(1/2), (2005), 43-72.

Mikolajczyk, Krystian, et al., "An a?ne invariant interest point detector", 7th European Conference on Computer Vision, (2002), 128-142.

Mikolajczyk, Krystian, et al., "Scale & Af?ne Invariant Interest Point Detectors", International Journal of Computer Vision 60(1), (2004), 63-86.

Moisan, Lionel, et al., "A probabilistic criterion to detect rigid point matches between two images and estimate the fundamental matrix", International Journal of Computer Vision, 57, (2004), 201-218.

Moisan, Lionel, et al., "Automatic Homographic Registration of a Pair of Images,with a Contrario Elimination of Outliers", Image Processing On Line, 2, (2012), 56-73.

Neubeck, Alexander, et al., "Efficient Non-Maximum Suppression", 18th International Conference on Pattern Recognition, vol. 3, IEEE, (2006), 850-855.

Oyallon, Edouard, "An Analysis of the SURF Method", Image Processing On Line, 5, (2015), 176-218.

Rabin, J, et al., "A contrario matching of SIFT-like descriptors", 19th International Conference on Pattern Recognition, IEEE, (2008), 1-4.

Rey-Otero, Ives, et al., "Anatomy of the SIFT Method", Image Processing On Line, 4, (2014), 370-396.

Simard, P Y, et al., "Boxlets: a fast convolution algorithm for signal processing and neural networks", Advances in Neural Information Processing Systems, (1999), 571-577.

Tola, Engin, et al., "DAISY: An Efficient Dense Descriptor Applied to Wide-Baseline Stereo", IEEE Transactions on Pattern Analysis and Machine Intelligence, vol. 32, No. 5,, (May 2010), 815-830.

Viola, P, et al., "Rapid object detection using a boosted", Proceedings of the IEEE Computer Society Conference, vol. 1., (2001), 511-518.

Yu, Guoshen, et al., "ASIFT: an algorithm for fully a?ne invariant comparison", Image Processing On Line, 1, (2011), 11-38.

"International Application Serial No. PCT/US2020/053487, International Search Report dated Dec. 16, 2020", 5 pgs.

"International Application Serial No. PCT/US2020/053487, Written Opinion dated Dec. 16, 2020", 6 pgs.

Hartmann, Wilfried, et al., "Recent developments in large-scale tie-point matching", ISPRS Journal of Photogrammetry and Remote Sensing, Amsterdam [U.A.] : Elsevier, Amsterdam, NL, vol. 115, (Oct. 20, 2015), 47-62.

"International Application Serial No. PCT/US2020/053487, International Preliminary Report on Patentability dated Apr. 28, 2022", 8 pgs.

\* cited by examiner

FAST DETERMINANT OF HESSIAN FILTERING FOR IMAGE TIEPOINT CANDIDATE AREA ASSESSMENT

TECHNICAL FIELD

This patent application claims the benefit of U.S. Provisional Patent Application No. 62/914,646, filed Oct. 14, 2019, which is incorporated by reference herein in its entirety.

TECHNICAL FIELD

Embodiments described herein generally relate to the determination of tiepoints in digital images, and in an embodiment, but not by way of limitation, a fast determinant of Hessian filtering for image tiepoint candidate area assessment.

BACKGROUND

Identification of multi-image conjugate locations for photogrammetric applications is known as "tiepoint" processing. The "conjugates" are image coordinates from two different images of the same area or ground feature. Automatic determination of such conjugates is often achieved via image matching techniques, such as normalized cross correlation (NCC) between local area patches of two different images. The success of the automatic algorithm relies on matching of image patches with good "texture" and/or "blob-like" features.

However, current approaches to image tiepoint conjugate matching involve a "brute force" approach or layout of candidate tiepoints and can take hours to run because image matching algorithms (such as NCC) are computationally expensive. This is particularly the case if the images are very large, like commercial satellite images tend to be.

This extensive processing is principally the result of a large number of matches failing to produce good results due to featureless image content. Consequently, in areas where there is low texture or contrast, executing this brute force layout of candidate grid points results in a lot of wasted processing because the expensive image matching processes are executed only to find out that it failed to locate any good tiepoints. While some algorithms for feature finding include fast approaches for finding good features, these algorithms typically do not take into account good image geometry information for conjugate matching. Moreover, using a traditional brute force grid approach normally results in hours of processing for very large sets of images because the brute force approach is algorithmically expensive, and that processing often results in failed matches.

It would be beneficial to have an improved, efficient process for determining good tiepoint conjugates because these tiepoints are required for photogrammetric algorithms. Specifically, there is a need for finding good tiepoint conjugates where there is a lot of textural blob-like features for an image matching process to lock onto.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
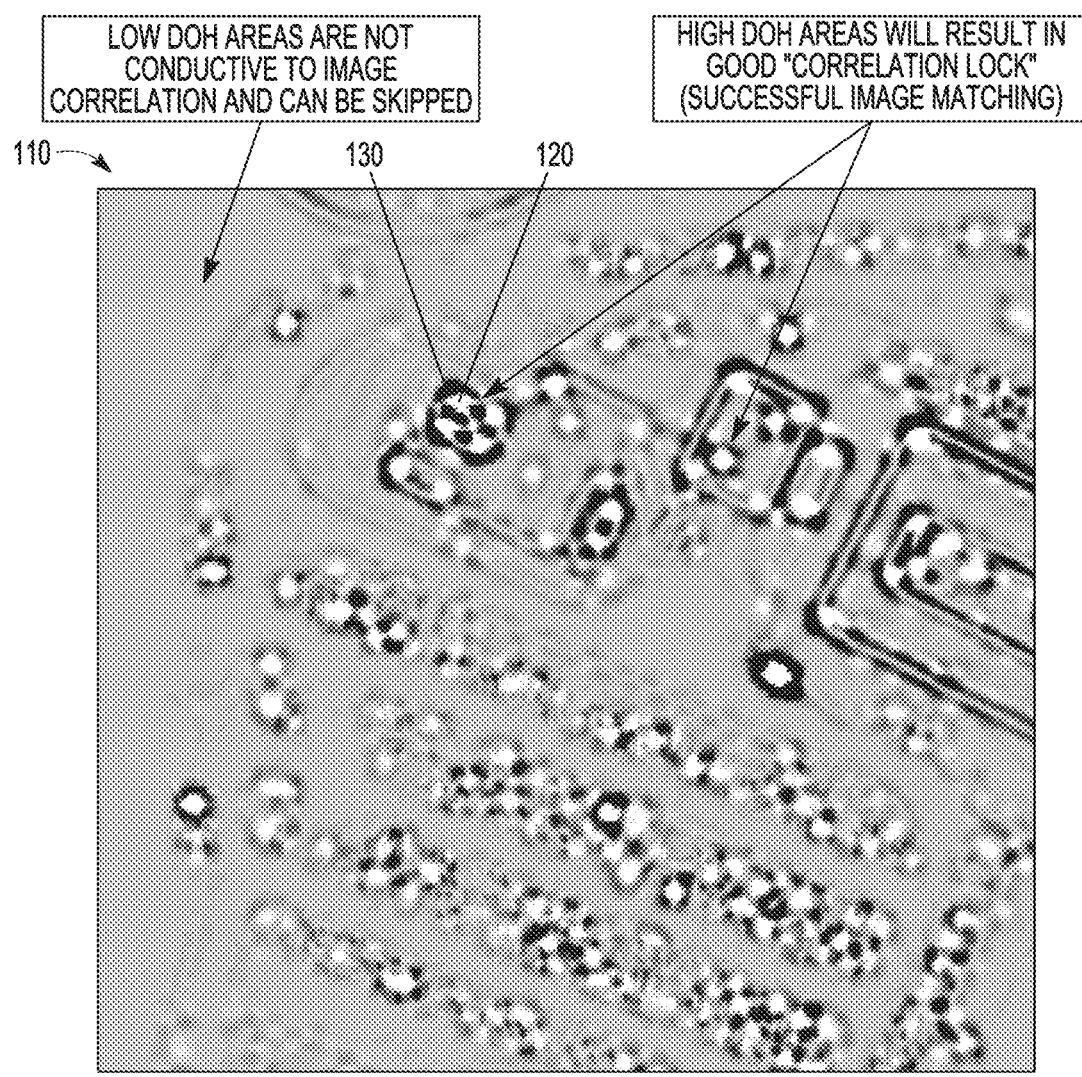
FIG. 1 is an example of a result of a determinant of Hessian filtering process.

The process of determining tiepoints finds conjugate locations in multiple images that represent the same point on the ground, area, or field of view. Automatic determination of these tiepoints is often achieved via image matching techniques, such as normalized cross-correlation (NCC). In these image matching techniques, when measuring the similarity between two patches from two different but related images, the success of an NCC-like algorithm requires image patches with good texture that have blob-like features. Some current matching algorithms provide a fast way of finding good texture in blobs. One technique is referred to as a fast determinant of Hessian filtering, which is essentially an edge and/or blob finder algorithm.

An embodiment leverages such approaches for finding good features for correlation of conjugate images for the location of candidate image tiepoints. Some such algorithms often operate at video rates. Thus, these algorithms such as a determinant of Hessian (DOH) filtering process are faster than an expensive "brute force" NCC. This identification of good features eliminates the need to perform expensive image matching processing in featureless areas that are prone to produce bad correlation results. By implementing a version of the DOH approach, the speed of the feature finding of the DOH approach is combined with elimination of non-productive correlations in areas of low contrast and texture. This embodiment can further be combined with an approach of finding conjugates using good geometric support data. For example, commercial imaging satellites typically have geolocation accuracy less than ten meters. The embodiment can therefore be thought of as a hybrid approach of merging DOH feature finding with current accurate conjugate matching algorithms, resulting in a significant speedup for tiepoint matching. If there is a location in a first image, that location can be projected down to the ground and then back up to a second image. This provides a precise and accurate result, even though the ground image mapping between images have error, and the exact location is not obtained. However, an image pixel matching process (such as NCC) is executed to correct for the error.

These fast feature-finding algorithms, such as the Speeded Up Robust Features (SURF) algorithm, entail efficient use of "integral images." The SURF and other algorithms find candidate regions by using second order image statistics, such as the aforementioned determinant of Hessian (DOH) filtering. However, these algorithms typically do not easily find conjugates ("matches") since they do not typically include good support data.

In an embodiment, the fast aspect of the DOH computations is first invoked, and then the "good feature" locations determined by the DOH computations are used as a seed location for traditional accurate image matching approaches. The filtering based on the DOH process eliminates featureless regions that would otherwise result in poor matching performance (i.e., wasted processing). As noted, the embodiments disclosed herein are hybrid in nature. That is, they use fast integral images and a DOH process to find good areas for correlation, and then use excellent image support data to easily match conjugates. The hybrid processing methods described herein (e.g., utilizing fast DOH with good geometry) significantly reduce wasted processing time while achieving accurate conjugate pairing.

In an embodiment, feature rich areas are combined with good geometry for conjugate pairing. The geometry refers to the mapping between the ground (or other object in the field of view) and the image of the ground. Then, the current image matching algorithm is only needed to be run in those candidate areas, so that processing is faster and thereby results in reduction of wasted processing time while still achieving accurate tiepoint pairing results.

In FIG. 1, the featureless areas 110 are locations wherein the DOH is essentially zero. The feature areas 120 are where the DOH is highly negative, and the feature areas 130 are where the DOH is highly positive. For any featureless area 110, when the fast DOH algorithm is executed first, the results of the DOH algorithm will indicate that the featureless areas 110 should simply be skipped. In strong-feature areas 120 and 130, the DOH is essentially measuring edge strength, or a derivative of the edge strength. The DOH algorithm provides, at the center of a blob, a very high value, and in the surrounding or edge areas of the blob a very low value. In areas where there are no blobs, that is the featureless areas 110, the DOH algorithm generates something in between, which is essentially zero (that is, zero texture). The strong-feature areas 120 and 130 are the areas that would be selected for candidate tiepoints for correlation. The featureless areas 110 would not be processed. The correlation will fail in those featureless areas 110 because the correlator essentially has nothing to lock onto in the featureless areas 110.

Figure 2:
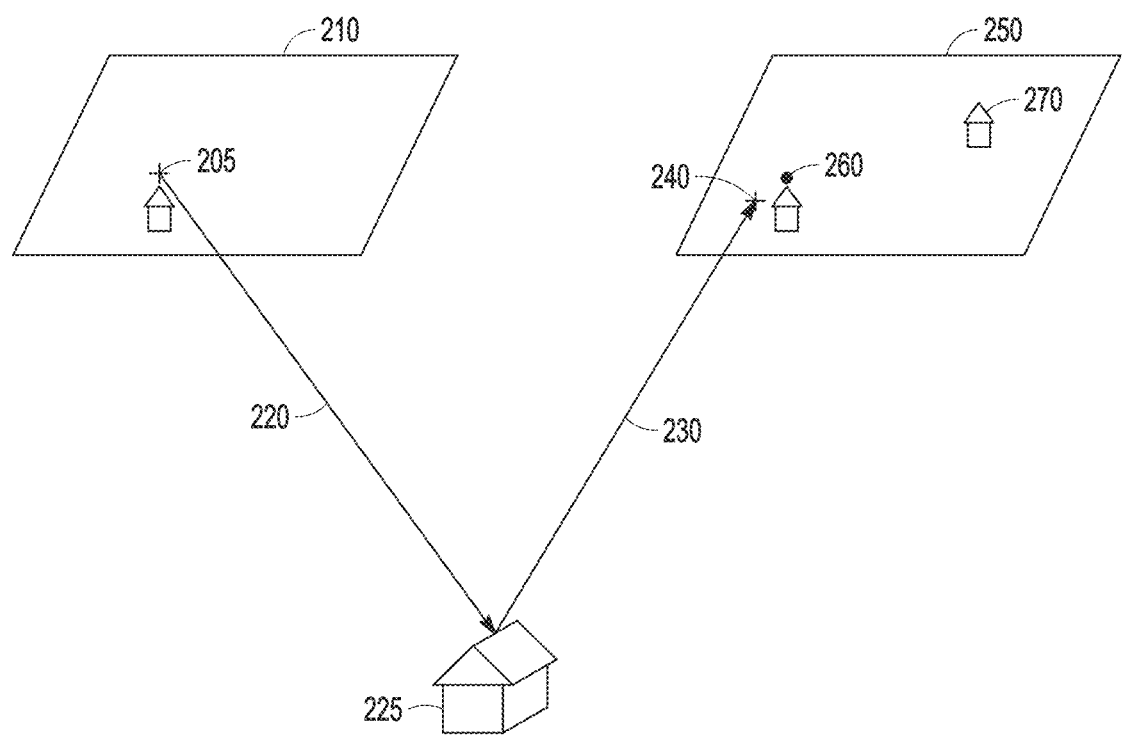
FIG. 2 illustrates a process of employing images' good geometric support data to identify true conjugate location.

FIG. 2 illustrates the process of employing the images' good geometric support data to identify true conjugate location. The candidate location 205 (determined by the DOH process) within image one 210 is projected down to the ground using image-one's geometric support data 220 resulting in a ground coordinate 225. The ground coordinate 225 is projected up via image-two's geometric support data 230 providing a conjugate candidate location 240 in image two 250. Due to slight errors in the geometry support data of the two images, the candidate conjugate location 240 in image two is incorrect. The image matching process provides the true conjugate location 260. Note that unlike prior art approaches, the good geometric support data of the images is able to distinguish the true conjugate location 260 from a similar but incorrect image feature 270.

Figure 3:
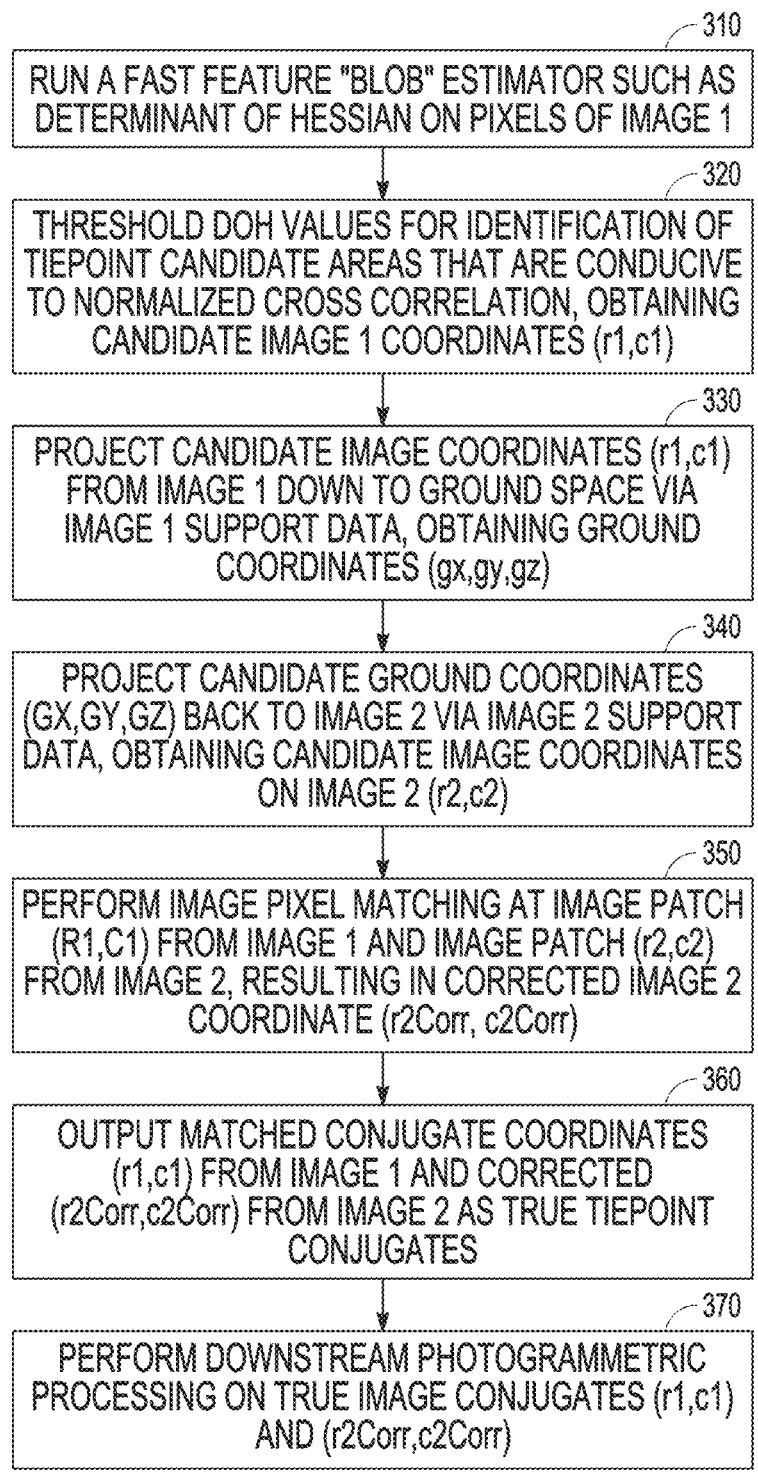
FIG. 3 is a block diagram illustrating features and operations of an embodiment of a system and process for using a fast determinant of Hessian filtering for image tiepoint candidate area assessment and subsequent conjugate image matching.

FIG. 3 is a block diagram illustrating operations and features of an example system and method for using a fast determinant of Hessian filtering for image tiepoint candidate area assessment. FIG. 3 includes a number of process blocks 310-370. Though arranged substantially serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 3, at 310, features in conjugate digital images are identified. As indicated at 310, the identification of the features in the first image (image one) uses second order image statistics to identify the features. The particular second order image statistics that are used are a determinant of Hessian (DOH) filtering process. The features in the conjugate digital images are normally blobs in the first digital image that are highly conducive to successful image matching techniques (such as normalized cross correlation, or NCC).

At 320, the DOH values are thresholded for regions that have strong edge or texture. Such thresholded areas will be highly conducive to successful image matching. Within 320, the image coordinates (i.e. image row and column locations) of such candidate areas from image one are denoted as (r1,c1). Note that there is a plurality of such coordinates. To simplify the following descriptions, one such image coordinate is concentrated on.

Since the images both have very good geometric support data, the candidate coordinates from image one (r1,c1) are first projected to the ground using support data from image one as depicted in 330. The result is a ground coordinate (gx,gy,gz) associated with the image coordinate (r1,c1) from image one. Within block 340, the ground coordinates (gx, gy,gz) from 330 are then projected to the space of image two via image-two's geometric support data, resulting in a candidate conjugate location (i.e., image row and column coordinates) in image two. The candidate conjugate location within image two is denoted as (r2,c2). If the image geometry were perfect, then image coordinates (r1,c1) and (r2,c2) would represent true conjugates (i.e., identical image features). However, the image geometry data for image one and image two contain slight errors. Within block 350, this slight error is corrected by image matching processing (such as NCC). The image matching processing is seeded at image 1 coordinates (r1,c1) and image 2 coordinates (r2,c2). The output of the matching processing are corrected image-two coordinates (denoted as (r2Corr, c2Corr) within block 350.)

Within block 360, the true conjugates (r1,c1) from image one and (r2Corr,c2Corr) from image two are output as the tiepoint locations. Downstream photogrammetry algorithms as depicted in block 370 can then use the true conjugate locations for further processing and subsequent correction of image geometric errors.

It is to be noted that the process in FIG. 3 can be n on a third (and subsequent images) to obtain additional conjugates between image one and image three, image one and image four, and so on. The process is thus not simply limited to a pair of images, but rather a plurality of images covering the same geographic area. The DOH process itself is also not strictly limited to being performed on image one. It can be run on any of the images, resulting in a combination of image matching. For example DOH can be run on image two with subsequent geometric projections and image matching run on image three resulting in tiepoints between image two and image three.

Figure 4:
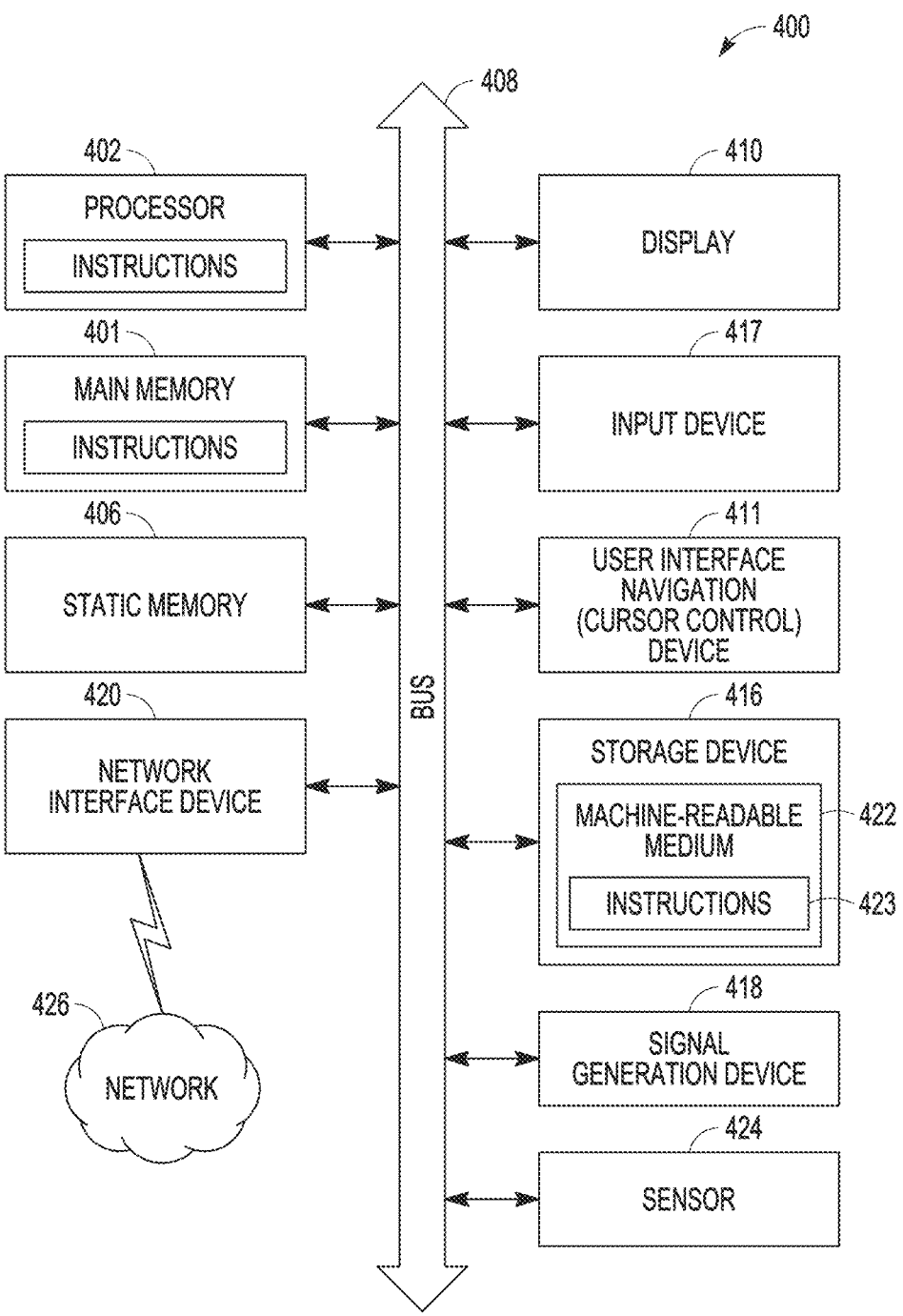
FIG. 4 is a block diagram illustrating an example embodiment of a computer system upon which one of more embodiments of the current disclosure can execute.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 417 (e.g., a keyboard), and a user interface (U) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 424, such as a global positioning system sensor, compass, accelerometer, or other sensor.

The drive unit 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:
1. A process comprising:
identifying, using a Determinant of Hessian (DOH), features of a first conjugate digital image resulting in first features;

identifying strong features in the first features resulting in first strong features, the first strong features including a DOH that is greater, in magnitude, than a threshold value;

projecting image coordinates of only the first strong features in a first image space of the first image to the ground and back up to a second image space of a second image using image-to-ground geometry support data of the first and second images resulting in second features; and correlating, using the first strong features and the second features, the first and second images resulting in an identification of candidate tie points using only portions of first and second images that include the first strong features and the second features, respectively.

2. The process of claim 1, wherein the first strong features comprise blobs or highly-textured areas.

3. The process of claim 1, comprising outputting the candidate tie points for downstream processing.

4. A non-transitory computer-readable medium comprising instructions that when executed by a process execute a process comprising:

identifying, using a Determinant of Hessian (DOH), features of a first conjugate digital image resulting in first features, identifying strong features in the first features resulting in first strong features, the first strong features including a DOH that is greater, in magnitude, than a threshold value;

projecting image coordinates of only the first strong features in a first image space of the first image to the ground and back up to a second image space of a second image using image-to-ground geometry support data of the first and second images resulting in second features; and correlating, using the first strong features and the second features, the first and second images resulting in an identification of candidate tie points using only portions of the first and second images that include the first strong features and the second features, respectively.

5. The non-transitory computer-readable medium of claim 4, wherein the first strong features comprise blobs.

6. The non-transitory computer readable medium of claim 4, comprising instructions for outputting the candidate tie points for downstream processing.

7. A system comprising:

a computer processor; and a computer memory coupled to the computer processor;

wherein the computer processor is operable for:

identifying, using a Determinant of Hessian (DOH), features of a first conjugate digital image resulting in first features;

identifying strong features in the first features resulting in first strong features, the first strong features including a DOH that is greater, in magnitude, than a threshold value;

projecting image coordinates of only the first strong features in a first image space of the first image to the ground and back up to a second image space of a second image using image-to-ground geometry support data of the first and second images resulting in second features; and correlating, using the first strong features and the second features, the first and second images resulting in an identification of candidate tie points using only portions of the first and second images that include the first strong features and the second features, respectively.

8. The system of claim 7, wherein the first strong features comprise blobs.

9. The system of claim 7, wherein the correlating the first and second images further comprises a normalized cross correlation (NCC).

* * * * *